United States Patent
Wray et al.

(10) Patent No.: US 10,917,203 B2
(45) Date of Patent: Feb. 9, 2021

(54) ESTIMATE BIT ERROR RATES OF NETWORK CABLES

(71) Applicant: Oracle International Corporation, Redwood Shores, CA (US)

(72) Inventors: Stuart Wray, Cambridge (GB); Felix Schmidt, Niederweningen (CH); Craig Schelp, Vancouver (CA); Pravin Shinde, Zurich (CH); Akhilesh Singhania, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/414,954

(22) Filed: May 17, 2019

(65) Prior Publication Data
US 2020/0366428 A1    Nov. 19, 2020

(51) Int. Cl.
*G06F 11/00* (2006.01)
*H04L 1/20* (2006.01)
(Continued)

(52) U.S. Cl.
CPC ............. *H04L 1/203* (2013.01); *H04B 17/26* (2015.01); *H04B 17/309* (2015.01); *H04L 1/0025* (2013.01); *H04L 43/50* (2013.01)

(58) Field of Classification Search
CPC ....... H04L 1/203; H04L 1/0025; H04L 43/50; H04B 17/26; H04B 17/309
See application file for complete search history.

(56) References Cited

U.S. PATENT DOCUMENTS 5,325,397 A * 6/1994 Scholz ............... H04L 1/24
                                                    375/224
5,418,789 A   5/1995 Gersbach et al.
(Continued)

OTHER PUBLICATIONS

Wald, Abraham, "Sequential Tests of Statistical Hypotheses". Annals of Mathematical Statistics. 16 (2): 117-186, dated Jun. 1945, 13 pages.

(Continued)

*Primary Examiner* — Albert Decady
*Assistant Examiner* — Enamul M Kabir
(74) *Attorney, Agent, or Firm* — Hickman Palermo Becker Bingham LLP

(57) ABSTRACT

Embodiments use Bayesian techniques to efficiently estimate the bit error rates (BERs) of cables in a computer network at a customizable level of confidence. Specifically, a plurality of probability records are maintained for a given cable in a computer system, where each probability record is associated with a hypothetical BER for the cable, and reflects a probability that the cable has the associated hypothetical BER. At configurable time intervals, the probability records are updated using statistics gathered from a switch port connected to the cable. In order to estimate the BER of the cable at a given confidence level, embodiments determine which probability record is associated with a probability mass that indicates the confidence level. The estimate for the cable BER is the hypothetical BER that is associated with the indicated probability mass. Embodiments store the estimate in memory and utilize the estimate to aid in maintaining the computer system.

22 Claims, 6 Drawing Sheets

(51) Int. Cl.
*H04B 17/309* (2015.01)
*H04L 12/26* (2006.01)
*H04L 1/00* (2006.01)
*H04B 17/26* (2015.01)

(56) References Cited

U.S. PATENT DOCUMENTS

| | | | | |
|---|---|---|---|---|
| 6,141,388 | A * | 10/2000 | Servais | H03M 13/6325 375/262 |
| 6,654,411 | B1 * | 11/2003 | Roberts | H04L 1/0083 375/225 |
| 6,728,259 | B1 * | 4/2004 | Gronberg | H04L 1/0009 370/252 |
| 6,744,893 | B1 * | 6/2004 | Fleming-Dahl | H04L 27/001 380/263 |
| 8,868,736 | B2 | 10/2014 | Bowler et al. | |
| 10,002,086 | B1 * | 6/2018 | Achtenberg | G06F 11/1048 |
| 2003/0065990 | A1 * | 4/2003 | Barford | G06F 11/221 714/704 |
| 2003/0076890 | A1 * | 4/2003 | Hochwald | H04L 1/0071 375/264 |
| 2005/0265321 | A1 * | 12/2005 | Rappaport | H04L 41/147 370/352 |
| 2005/0280568 | A1 * | 12/2005 | Rowland | H03M 1/0809 341/155 |
| 2006/0002460 | A1 * | 1/2006 | Maucksch | H04L 1/24 375/227 |
| 2006/0200710 | A1 * | 9/2006 | Webb | H04L 1/203 714/704 |
| 2006/0291591 | A1 * | 12/2006 | Ghosh | H04L 1/203 375/340 |
| 2007/0076669 | A1 * | 4/2007 | Boroujeny | H03M 13/47 370/335 |
| 2007/0086353 | A1 * | 4/2007 | Gefflaut | H04L 1/002 370/252 |
| 2007/0162788 | A1 * | 7/2007 | Moelker | H04L 1/20 714/704 |
| 2007/0274378 | A1 * | 11/2007 | Warke | H04B 17/26 375/225 |
| 2011/0206204 | A1 * | 8/2011 | Sychev | H04J 14/0212 380/256 |
| 2011/0314358 | A1 * | 12/2011 | Langenbach | H04L 1/20 714/786 |
| 2013/0036335 | A1 * | 2/2013 | Kim | G09G 3/006 714/704 |
| 2013/0215826 | A1 * | 8/2013 | Kalyani | H04L 25/0204 370/328 |
| 2014/0043042 | A1 * | 2/2014 | Billau | G06F 21/606 324/612 |
| 2014/0099099 | A1 | 4/2014 | Dupuis et al. | |
| 2015/0310349 | A1 | 10/2015 | Li et al. | |
| 2016/0006589 | A1 * | 1/2016 | Kamali | H04L 25/03343 375/232 |
| 2017/0068580 | A1 * | 3/2017 | Johnson | G06F 11/0793 |
| 2019/0108111 | A1 * | 4/2019 | Levin | G06F 13/4295 |

OTHER PUBLICATIONS

Wald, A.; Wolfowitz, J. "Optimum Character of the Sequential Probability Ratio Test". The Annals of Mathematical Statistics. 19 (3): 326-339, dated 1948.

RuiGao et al., "Bayesian bit error rate estimation in FOG inclinometer well logging communication", dated 2009, http://en.cnki.com.cn/Article_en/CJFDTOTAL-DZCL200901012.htm, 2 pages.

L. Barford, "Sequential Bayesian bit error rate measurement", IEEE Transactions on Instrumentation and Measurement (vol. 53, Issue: 4, Aug. 2004), 2 pages.

Holzlohner et al., "Accurate calculation of eye diagrams and bit error rates in optical transmission systems using linearization", Journal of Lightwave Technology (vol. 20, Issue: 3, Mar. 2002), 2 pgs.

Fang et al., "Efficient Bit Error Rate Estimation for High-Speed Link by Bayesian Model Fusion", dated 2015, 6 pages.

Eiting, Mindert, "Sequential Reliability Tests", Applied Psychological Measurement, vol. 15, No. 2, dated Jun. 1991, 13 pages.

Alam et al., "Bit Error Rate Optimization in Fiber Optic Communications", International Journal of Machine Learning and Computing, vol. 1, No. 5, dated Dec. 2011, 6 pages.

* cited by examiner

202 — MAINTAIN A PLURALITY OF BIT ERROR RATE (BER) PROBABILITY RECORDS FOR A PARTICULAR NETWORK CABLE ATTACHED TO A PARTICULAR SWITCH, IN A COMPUTER NETWORK, AT A PARTICULAR PORT, WHERE EACH BER PROBABILITY RECORD, OF THE PLURALITY OF BER PROBABILITY RECORDS: IS ASSOCIATED WITH A RESPECTIVE HYPOTHETICAL BER, AND INDICATES A RESPECTIVE PROBABILITY THAT THE PARTICULAR NETWORK CABLE HAS THE HYPOTHETICAL BER ASSOCIATED WITH THE RESPECTIVE BER PROBABILITY RECORD

204 — BASED, AT LEAST IN PART, ON STATISTICS FOR THE PARTICULAR PORT, DETERMINE A TIME PERIOD-SPECIFIC NUMBER OF ERRORS DETECTED IN PACKETS THAT PASSED THROUGH THE PARTICULAR PORT OVER A PARTICULAR PERIOD OF TIME

206 — UPDATE THE PLURALITY OF BER PROBABILITY RECORDS BY, FOR EACH BER PROBABILITY RECORD OF THE PLURALITY OF BER PROBABILITY RECORDS: DETERMINING A RESPECTIVE UPDATED PROBABILITY OF DETECTING THE TIME PERIOD-SPECIFIC NUMBER OF ERRORS, FOR THE PARTICULAR NETWORK CABLE, GIVEN THE HYPOTHETICAL BER ASSOCIATED WITH THE RESPECTIVE BER PROBABILITY RECORD, AND STORING, IN THE RESPECTIVE BER PROBABILITY RECORD, A VALUE THAT REPRESENTS THE RESPECTIVE UPDATED PROBABILITY

208 — AFTER UPDATING THE PLURALITY OF BER PROBABILITY RECORDS, IDENTIFY AN ESTIMATED BER FOR THE PARTICULAR NETWORK CABLE BASED ON THE ESTIMATED BER BEING ASSOCIATED WITH A BER PROBABILITY RECORD, OF THE PLURALITY OF BER PROBABILITY RECORDS, THAT HAS A PARTICULAR PROBABILITY MASS

210 — GENERATE, WITHIN A MEMORY, OUTPUT THAT SPECIFIES THE ESTIMATED BER FOR THE PARTICULAR NETWORK CABLE

ESTIMATE BIT ERROR RATES OF NETWORK CABLES

FIELD OF THE INVENTION

The present invention relates to providing support for maintenance of computer network infrastructure and, more specifically, to providing estimates for the bit error rates of network cables within a computer networking system.

BACKGROUND

Network interfaces in computer networking systems are connected by cables, which can be very expensive to maintain. In most cases, network interfaces are configured for 10 Gbps Ethernet carried either over copper cables or fiber cables. Most of the cables in any given networking system are good, having very low error rates. However, as cables degrade, they develop more significant error rates and, if left unchecked, can cause user-visible system degradation. Given the complexity of networking systems, the source of cable-based network degradation may not be immediately attributed to cable failure. As such, it can be expensive to identify the failing cables as the source of a given network issue.

Generally, a bit error rate (BER) of $10^{-12}$ is considered a threshold of acceptability for proper system functionality, and any worse rate than that is generally considered faulty. At 10 Gbps and 100% utilization, a BER of $10^{-12}$ results in one error every 100 seconds. With a lower cable utilization, the number of errors seen during the same timeframe would be proportionally less. For example, at 1% utilization, errors would still happen at the same rate, but 99% of the errors generally do not impact a data frame, so user-visible dropped frames would occur about once every three hours.

In practice, the BER for good cables is likely to be very much better than $10^{-12}$. The figure of $10^{-12}$ is regarded as a workable rate for long copper cables, but short copper cables would be expected to be better than long ones, and fiber better than copper, with a BER of perhaps $10^{-16}$. Some cables plug into separate transceivers; some cables are manufactured with integrated transceivers at each end, and these cables generally have even better error rates.

However, even at a borderline BER of $10^{-12}$ and potentially one user-visible error every 100 seconds, that rate of dropped packets is usually negligible. In fact, this rate of dropped packets is orders of magnitude less than the rate of packet drops that would be expected due to full buffers in Transmission Control Protocol (TCP) rate-control.

Nevertheless, cable degradation is a non-negligible problem for at least two reasons. First, cables can degrade over time due to atmospheric pollution. For example, the air around a networking system may contain small, but damaging, quantities of hydrogen-sulfide. These damaging gasses can be produced by surrounding industries, lead-acid batteries outgassing inside the datacenter, etc. Such pollution surrounding network cables can lead to corrosion of metal connectors on cables, or microscopic pollution whiskers within the connectors, and consequently to an increased BER for the cables. This atmospheric-caused degradation is a gradual process that can take weeks or months to degrade cables to a user-detectable failure.

Second, cable transceivers are sensitive to temperature, and may have higher error rates depending on the environment in which they are run. Also, lower-quality cables (which may be selected for a computer system to reduce expenses) may have a smaller range of tolerable temperatures than higher-quality cables. Furthermore, not all cables in a given manufactured batch have the same temperature tolerance. Thus, it can be difficult to ensure that network cables are run in environments best-suited to their proper functioning.

Degraded cables should be replaced to ensure acceptable levels of computer system performance, thereby avoiding potentially user-visible failures and potential breaches of service agreements. However, replacing cables that are performing acceptably results in increasing the cost of system upkeep beyond what is necessary. Thus, only cables that exhibit more than a certain BER should be replaced.

System administrators may replace cables in response to: (a) detecting user-visible errors within a computer networking system, and (b) identifying one or more faulty cables as the cause of those errors. However, at that point, the degraded cables continue to negatively impact the system while administrators work to identify the issue.

Alternatively, system administrators may attempt to predict the BER of cables within the system in order to preemptively replace cables before they fail. However, the visible errors resulting from cable degradation are generally infrequent, even when cable BERs are in a questionable or unacceptable range. Thus, producing meaningful and reliable estimates of the BERs of deployed cables is a non-trivial task.

A simple approach to network cable BER estimation is to set an alarm threshold keyed to the number of IP packets discarded by a switch at a given port, which information is maintained by the switches. However, this technique suffers from the problem that high-utilization ports naturally see more errors because they experience more traffic. Meanwhile, low-utilization ports generally see fewer errors, even when servicing cables with unacceptably high BERs, simply because they experience less traffic. Thus, a naïve threshold that considers only dropped packets, and not port utilization, results in unreliable BER estimates.

Further, even if both dropped packets and port utilization statistics are used to estimate cable BERs, a BER estimation system using a purely threshold-based technique tend to either be too sensitive, or not sensitive enough. Specifically, such techniques generally consider those statistics that have been most recently retrieved from network ports, which record data that is observed over the most recent short time interval (for example one minute). Furthermore, there is no confidence metric associated with such threshold tests. Because errors do not occur consistently, but may be bursty or random, the short window of time reflected in statistics over which the threshold test is generally performed may not be an accurate gauge of true cable BERs.

Bayesian Analysis

Another technique is to base cable BER estimations on sequences of network traffic statistics collected over time. A technique which does this is the Sequential Probability Ratio Test (SPRT), which is described below, after a brief treatment of Bayesian analysis.

The simplest numerical approach to Bayesian analysis is to:
 select a manageable number of discrete hypotheses;
 assign each of these hypotheses an initial "prior" probability; and
 for each item of data in turn, update the probability of every hypothesis.

Thus, every of hypothesis $H_i$ is assigned a prior probability $P(H_i|)$, which means "the probability of $H_i$, given no other information". These prior probabilities reflect known beliefs about the hypotheses before any data is considered.

Next, for each item of observed data in turn, the probability of every hypothesis is updated using Bayes rule:

$$P(H_i \mid D) = \frac{P(D \mid H_i)P(H_i \mid)}{P(D \mid)}$$

In other words, for each item of observed data (D), the probability of every hypothesis $H_i$ is updated by:
  multiplying the prior probability of $H_i$—represented by $P(H_i\mid)$, which, in the first instance of data, is the assigned probability, and which, in subsequent cases, is the previously calculated probability of $H_i$—by $P(D\mid H_i)$, which is the probability of seeing data D given the hypothesis $H_i$; and then
  normalizing the result by dividing the result by $P(D\mid)$, which is the probability of getting data D "assuming nothing", or in other words, the probability of the data averaged over all the hypotheses. The meaning of $P(D\mid)$ is made more concrete in the version of Bayes rule below:

$$P(H_i \mid D) = \frac{P(D \mid H_i)P(H_i \mid)}{\sum_i P(D \mid H_i)P(H_i \mid)}$$

Sequential Probability Ratio Test

The SPRT uses the above Bayesian machinery, but with only two hypotheses, $H_0$ and $H_1$, as follows:
  Start with a uniform prior on $H_0$ and $H_1$.
  When the next item of data arrives, update $P(H_i\mid D)$, as indicated above.
  Before considering the next piece of data, calculate the current Probability Ratio, S:

$$S = \frac{P(H_0 \mid D \ldots)}{P(H_1 \mid D \ldots)}$$

Compare S to a predefined value a. Accept $H_0$ and terminate if S>a.
  Compare S to a predefined value b. Accept $H_1$ and terminate if S<b.
  Otherwise go back and wait for the next item of data before expressing a verdict.

The values a and b are chosen based on the desired values for $\alpha$, which is the false-positive error rate (i.e., the chance of erroneously accepting $H_0$), and $\beta$, which is the false-negative error rate (i.e., the chance of erroneously accepting $H_1$). Hence $\alpha$ and $\beta$ can be made arbitrarily small, but the consequence will be that the test will need to consume arbitrarily more data before it reaches a conclusion. It is this variable stopping condition which makes SPRT a Sequential Probability Ratio Test.

Accordingly, the SPRT technique requires sorting observed data into probability distributions for the two hypotheses. However, very few interfaces in a datacenter have any errors in a whole day. Further, even those interfaces that experience errors do not experience errors every minute. Given the sparsity of the data, it is not clear that the SPRT would have access to sufficient data in order to be trained, which makes utilization of the SPRT in the case of cable BER estimation relatively impractical.

Furthermore, as indicated above, use of the SPRT requires the selection of two hypotheses, which represent two BERs defining "good" and "bad" cables. Without detailed analysis of sufficient data, it is not clear what values to use for these two hypothesis, and it is also not clear how to theoretically determine the probability distributions that are needed. This uncertainty might be resolved empirically by training a probability model using a large amount of data, which, as indicated above, is not always available for network cables. Furthermore, SPRT does not guarantee results within any particular time period because, many times, the result of SPRT is indefinite given the variable stopping condition inherent to the technique. Also, techniques like SPRT, which intrinsically produce a verdict rather than an estimated value, must employ some other method to produce desired cable BER estimates.

Thus, it would be beneficial to estimate the BER of network cables reliably, without requiring large amounts of training data, in order to facilitate accurate and cost-effective maintenance of cables within a networking system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for analyzing switch statistics to estimate a bit error rate for a network cable.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments use Bayesian techniques to efficiently estimate the bit error rates (BERs) of cables in a computer network at a customizable level of confidence. Specifically, a plurality of probability records are maintained for a given cable in a computer system, where each probability record is associated with a hypothetical BER for the cable, and reflects a probability that the cable has the associated hypothetical BER. At configurable time intervals, the probability records are updated using statistics gathered from a switch port connected to the network cable. Specifically, using Bayesian techniques and statistics from a configurable timeframe (e.g., gathered in the past hour), each probability record is updated to reflect the most-current probability that the cable has the associated hypothetical BER.

In order to estimate the BER of the cable at a customizable confidence level, such as 90%, embodiments determine which probability record is associated with a probability mass, such as 0.1, that indicates the confidence level. For example, if the hypothetical BERs for a given cable range from $10^{-5}$ to $10^{-20}$, embodiments determine a minimum estimated BER for a given cable by adding probabilities of the hypothetical BERs, from the probability records, starting from the most optimistic BER ($10^{-20}$) until the resulting probability mass equals 0.9. The hypothetical BER associated with the indicated probability mass is 90% likely to be larger than (i.e., worse than) the BER of the cable and, as such, is taken to be the estimated maximum for the cable BER. Embodiments utilize the cable BER estimates to aid in maintaining the computer system, e.g., by triggering an alert if an estimated BER is less than an alert threshold.

As such, embodiments avoid the need for large amounts of training data. Furthermore, the techniques described herein result in an estimated BER, rather than a more general verdict as with the SPRT, thereby providing meaningful estimation results in a guaranteed time without respect to the data on which the estimates are based.

Also, embodiments efficiently produce BER estimates that are bound by a configurable confidence metric, which allows system administrators flexibility in utilization of the BER estimation techniques. Further, embodiments enable network administrators to change alarm thresholds or confidence metrics in an understandable and straightforward way, i.e., by changing a human-readable value utilized by the BER estimation system.

Network Arrangement and Statistics

Figure 1:
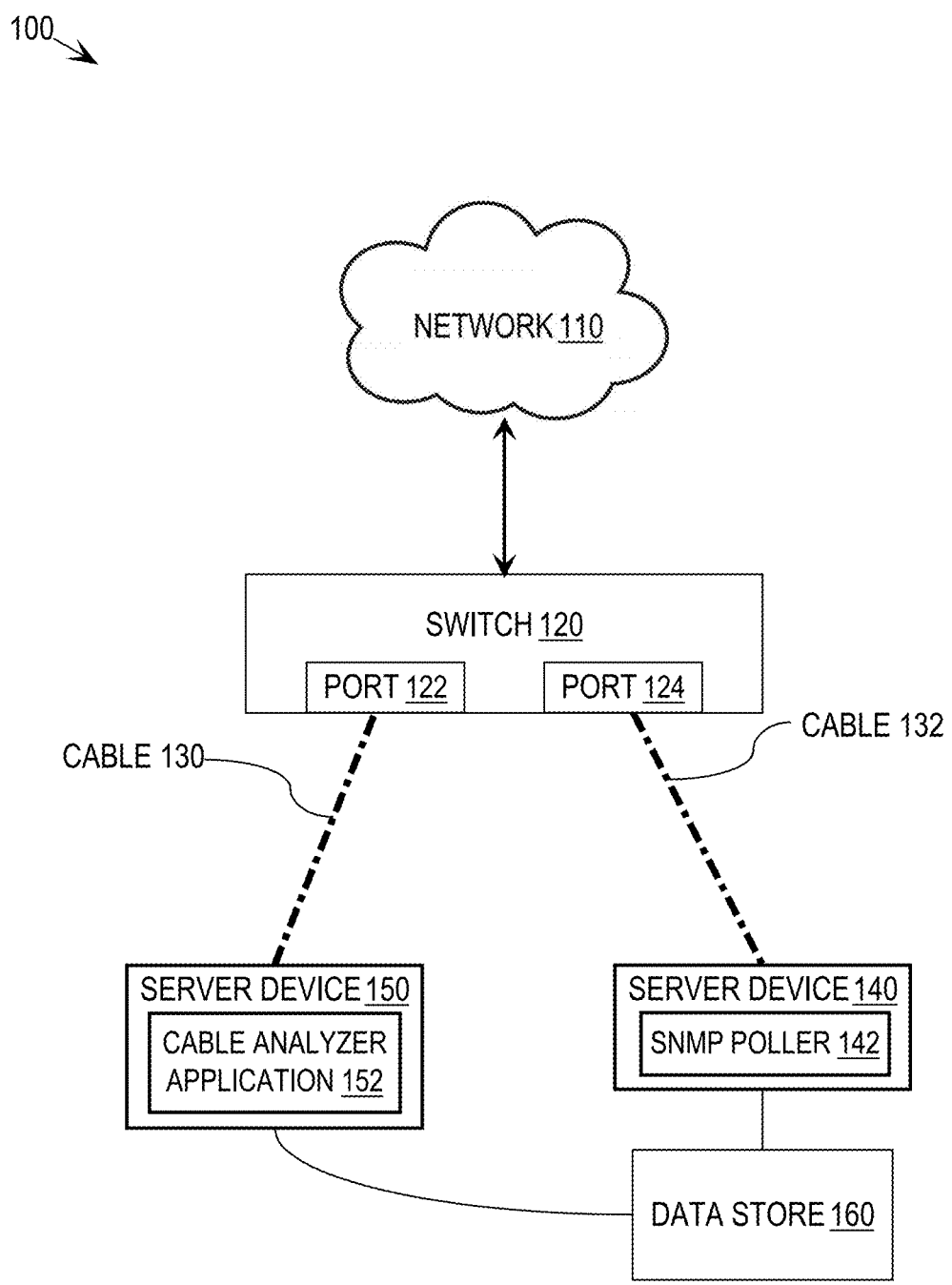
FIG. 1 depicts an example arrangement of hardware in a computer network.

FIG. 1 depicts an example network arrangement 100 of hardware in network 110, which includes a switch 120 that is communicatively coupled to other hardware in the network. Among other things, switch 120 is communicatively connected to a server device 150 via a cable 130 connected to a port 122 of switch 120. Further, switch 120 is communicatively coupled to a server device 140 via a second cable 132 connected to a second port 124 of switch 120. Cables 130 and 132 are physical cables (copper, fiber, etc.) that carry network traffic between the respective server devices and switch 120. FIG. 1 further depicts a data store 160 communicatively coupled to both server device 150 and server device 140. Data store 160 may be implemented using any kind of data storage/database management scheme, and may be maintained in storage that is either part of one of the server devices or independent therefrom.

An SNMP poller application 142 runs on server device 140 and a cable analyzer application (CAA) 152 runs on server device 150. An application or service, such as SNMP poller application 142 or CAA 152, runs on a computing device and comprises a combination of software and allocation of resources from the computing device. Specifically, an application or service is a combination of integrated software components and an allocation of computational resources, such as memory, and/or processes on the computing device for executing the integrated software components on a processor, the combination of the software and computational resources being dedicated to performing the stated functions of the application or service.

SNMP poller 142 reads data from switches in network 110, including from switch 120. According to an embodiment, SNMP poller 142 automatically reads data from switches in network 110 once every 60 seconds, which is a configurable interval for the poller. According to an embodiment, SNMP poller 142 retrieves, for every port on every switch in network 110, at least the following data:

TIME. The poll-time, represented as an integer number of seconds in the Unix epoch.

ifInErrors. A running total of the number of errors in packets detected on this port.

ifInBitsPerSecond. The recent average input bits per second on this port.

CAA 152, running on server device 150, analyzes the data collected by SNMP poller 142 and automatically estimates bit error rates (BERs) for cables in network 110, including for cables 130 and 132. FIG. 2 depicts a flowchart 200 for analyzing switch statistics to estimate a bit error rate for a network cable.

Hypothetical Bit Error Rate Probability Records

At step 202 of flowchart 200, a plurality of bit error rate (BER) probability records are maintained for a particular network cable attached to a particular switch, in a computer network, at a particular port, where each BER probability record, of the plurality of BER probability records: is associated with a respective hypothetical BER, and indicates a respective probability that the particular network cable has the hypothetical BER associated with the respective BER probability record. For example, CAA 152 maintains a plurality of probability records for cable 130, each of which corresponds to a discrete hypothetical BER of cable 130 within a configurable range of BERs.

According to an embodiment, CAA 152 logarithmically spaces the hypothetical BERs between each factor of 10 within the configurable range of BERs such that the hypothetical BERs are evenly spaced on a logarithmic scale rather than on a linear scale. For example, CAA 152 maintains a probability record for each of 150 BER hypotheses for cable 130 ranging from $10^{-5}$ down to $10^{-20}$, where each factor of 10 in the range has 10 hypotheses spaced logarithmically within.

According to an embodiment, when the plurality of probability records for cable 130 are initialized, all hypothetical BERs are given an equal probability. Specifically, if there are no known beliefs regarding which hypotheses are more likely than others, then this is expressed by setting the prior probabilities to be small equal values that sum to 1.0. Even when there is some prior knowledge, supposing sufficient data, it is generally simpler to make the initial probabilities equal, because these prior probabilities will be swamped and the final answer will depend almost entirely on the data.

The following pseudocode illustrates initializing the plurality of probability records with equal probability values:

ber_hypothesis_list=[10**(-i/10.0) for i in range(50, 200)]
    ber_to_log_prob_dict=dict( )
    for ber in ber_hypothesis_list:
    ber_to_log_prob_dict[ber]=1.0 #sorted out when we normalise
    log_normalise_prob_dict_in_place(ber_to_log_prob_dict)

Specifically, in the example pseudocode, the plurality of hypothetical BERs are represented by the keys of the dictionary ber_to_log_prob_dict, and the dictionary values that are accessed via the keys are the probability values for the associated hypothetical BER. Further, the pseudocode depicts performing the needed calculations using logs of probabilities rather than probabilities directly, which addresses the issue of the probability numbers getting so small that they underflow in a floating point representation. Furthermore, the pseudocode shows normalizing the initial values for the probability records via the function log_normalise_prob_dict_in_place, which causes the sum of all of the values in the maintained plurality of probability records to be 1.0.

Updating Probability Records Based on Statistics from A Configurable Timeframe

At step 204, based, at least in part, on statistics for the particular port, determining a time period-specific number of errors detected in packets that passed through the particular port over a particular period of time. For example, CAA 152 uses statistics from port 122 stored in data store 160 to determine a number of errors that were detected for cable 130 over a configurable time period. Data store 160 at least includes information gathered by SNMP poller 142 from port 122 of switch 120. To illustrate, SNMP poller 142 retrieves a set of data for port 122 every minute and stores each set of data in data store 160. The most recent set of data for port 122 retrieved by SNMP poller 142 includes a TIME field with the timestamp value 23460, an ifInErrors field with the value 230, and an ifInBitsPerSecond field with the value 1 Gbps. Accordingly, data store 160 includes historical statistics, for at least port 122, that can be used to update the hypotheses for cable 130.

According to an embodiment, the determination of the time period-specific number of errors for cable 130 is performed in response to CAA 152 determining to update the plurality of probability records maintained for cable 130, e.g., because new statistics for cable 130 are available, or because a configurable time interval (e.g., one minute) has passed since the last time the records were updated, etc. Specifically, according to an embodiment, CAA 152 waits a configurable amount of time between updating the probability records for any given cable. For example, CAA 152 updates the probability records for every cable every minute, which generally coincides with the frequency of SNMP pollers retrieving new data from network switches.

According to an embodiment, CAA 152 utilizes information from a configurable timeframe (such as one hour) to determine the time period-specific number of errors for cable 130, which is used to update the probability records for the cable as described in further detail below. The timeframe for the data that is used to update the probability records affects how promptly the current probabilities will reflect changing behavior. With a longer window, CAA 152 generally provides a more accurate estimate of low BERs, but has a slow response to changes in cable BERs. With a shorter window, CAA 152 generally responds more rapidly to changes in BERs, and provides an adequate estimate of high BERs, but the measurement of low BERs is less accurate. Given the typical bit rates generally observed on switch ports, the choice of 60 minutes for the configurable timeframe caters to the ranges of BERs that are of interest from a network maintenance perspective, e.g., $10^{-12}$.

Returning to an illustration of step 204 of flowchart 200, CAA 152 determines, based on values of the ifInErrors fields in data store 160 that are associated with TIME field timestamps that mark times within the past hour, that cable 130 has experienced five errors in the past hour. According to an embodiment, CAA 152 further determines an average bit rate for cable 130 by averaging the ifInBitsPerSecond field values that are associated with TIME field timestamps that mark times within the past hour. This average bit rate for cable 130 is used in connection with determining the probabilities of seeing the determined number of errors in the past hour based on the various hypothetical BERs for cable 130.

At step 206 of flowchart 200, the plurality of BER probability records are updated by, for each BER probability record of the plurality of BER probability records: determining a respective updated probability of detecting the time period-specific number of errors, for the particular network cable, given the hypothetical BER associated with the respective BER probability record, and storing, in the respective BER probability record, a value that represents the respective updated probability. For example, in response to determining to update the probability records for cable 130, CAA 152 automatically updates the maintained probability records associated with each hypothetical BER for cable 130 based on the determined number of errors detected on cable 130 within the configurable time period (e.g., five errors in one hour).

Probability Calculation for Hypothetical Bit Error Rates

To update the probability associated with a given BER hypothesis (e.g., $10^{-10}$) for cable 130, CAA 152 calculates $P(D|H_{10^{-10}})$. This determination can be described as determining the probability of seeing five errors in one hour, given the hypothesis that the BER for cable 130 is $10^{-10}$.

According to an embodiment, CAA 152 models the rate of errors on a given cable using a Poisson distribution, which results in a relatively simple calculation given that a Poisson distribution does not take into account errors that were found in previous data. In other words, the assumption that errors, for a network cable, are Poisson distributed is an assumption that (a) the number of errors observed in a particular time interval depends only on the length of the interval, and (b) the numbers of errors in any time interval are not influenced by errors in any earlier interval. Thus, historical data (beyond the configurable timeframe used to determine the current sampled error rate as described herein) is not required to determine the probability of the errors given a certain error rate hypothesis.

The following pseudocode illustrates updating the probabilities of each of the plurality of probability records maintained for a given cable stored in the dictionary ber_to_log_prob_dict. The pseudocode further normalizes the resulting updated probabilities using the log_normalise_prob_dict_in_place function.

(1) sample_interval=TIME−prev_TIME
(2) sample_errors=ifInErrors−prev_ifInErrors
(3) sample_rate=ifInBitsPerSecond
(4) #update our belief about each hypothetical BER
(5) for ber in ber_to_log_prob_dict:
(6) log_p_H_prior=ber_to_log_prob_dict[ber]
(7) expected=sample_rate*sample_interval*ber
(8) log_p_D_given_H=log_poisson(expected, sample_errors)
(9) #P(H|D)=P(D|H) P(H)/ . . .
(10) log_likelihood_H_given_D=log_p_D_given_H+log_p_H_prior
(11) # . . . update map with posterior likelihood . . .
(12) ber_to_log_prob_dict[ber]=log_likelihood_H_given_D
(13) # . . . finally, normalize back to log probs . . . /P(D|)
(14) log_normalise_prob_dict_in_place(ber_to_log_prob_dict)

Specifically, in the pseudocode, sample_interval represents the configurable time period (line 1), sample_errors represents the observed number of errors on the cable during the time period (line 2), and sample_rate represents the observed bit transfer rate over the cable (line 3). In the pseudocode, for each probability record associated with a respective hypothetical BER in ber_to_log_prob_dict (line 5), log_p_H_prior represents the previously determined probability for the hypothetical BER (line 6), expected represents the expected number of errors given the hypothetical BER (line 7), and log_p_D_given_H represents the probability of seeing sample_errors given the expected number of errors (line 8). Furthermore, log_likelihood_H_given_D represents the "likelihood" of the hypothesis given the data, which is the currently determined probability added to the previously-determined probability without the summation having yet been normalized (line 10). Line 12 of the pseudocode updates the respective probability record with the updated "likelihood" value log_likelihood_H_given_D, and line 14 normalizes the values of all of the updated probability records in ber_to_log_prob_dict.

The following pseudocode illustrates an example definition for log_poisson:

```
def log_poisson(lamb, k):
    #lamb=expected events in sample interval
    #k=events actually seen
    if k==0:
        return –lamb
    else:
        return k*log(lamb)–lamb–log_factorial(k)
```

In the above pseudocode, log_factorial(k) returns the natural log of k!, or k-factorial.

Figure 3A:
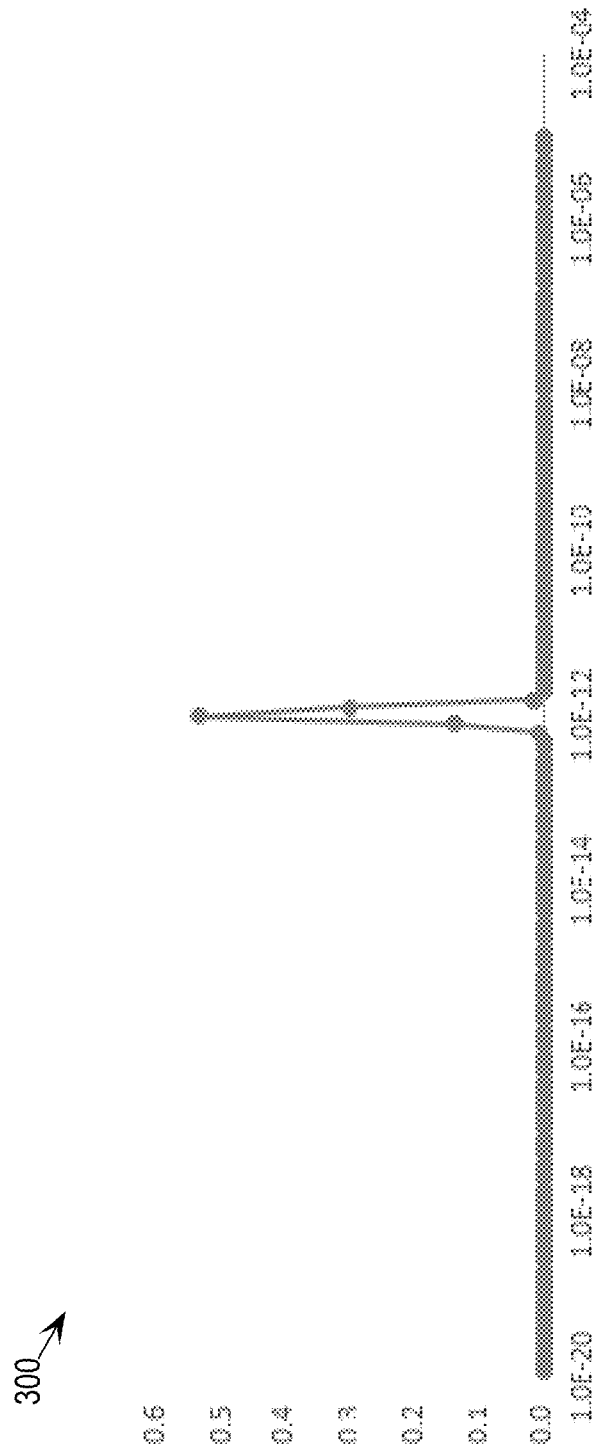
FIGS. 3A and 3B depict example graphs of probability distributions plotted as probability mass functions.
Figure 3B:
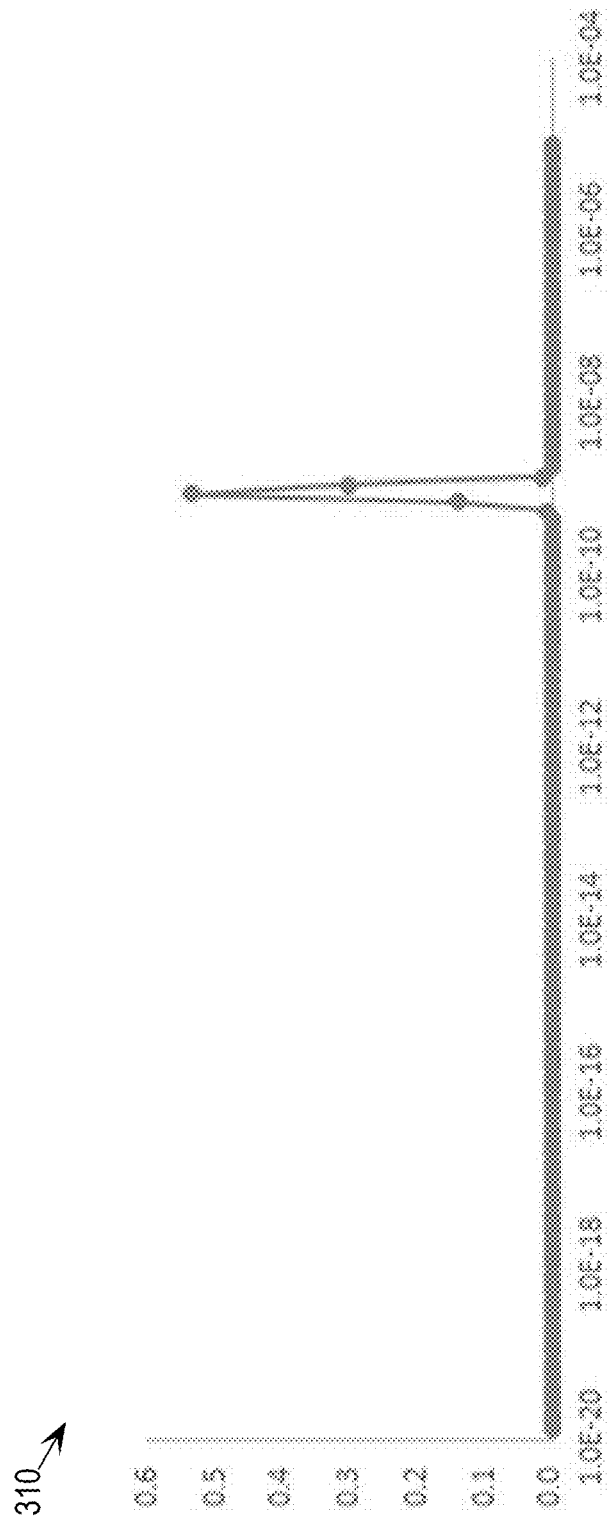

FIGS. 3A and 3B depict two graphs 300 and 310 of example probability distributions (BER values on x-axis, probability values on y-axis), e.g., from ber_to_log_prob_dict, plotted as probability mass functions. Specifically, graph 300 shows a probability distribution with the probability mass focused around the BER $10^{-12}$, and graph 310 shows a probability distribution with the probability mass focused around the BER $10^{-9}$.

Assuming a steady BER for cable 130 over time, as CAA 152 progressively updates the probability records maintained for cable 130, the probability mass represented by the records will become sharply clustered around a few hypothetical BERs, as shown in graphs 300 and 310. However, with more limited time for probability updates, the probability mass associated with the hypothetical BERs will be more widely distributed among the records.

One of the charming properties of this Bayesian approach is that it is extremely robust, and it gives meaningful results whatever data is given to it. For example, if there are no errors during one or more of the sample periods, then high-BER hypotheses will be ruled out and low-BER hypotheses will be assigned additional probability mass.

Estimating the Bit Error Rate of the Cable Using the Probability Records

Returning to the discussion of flowchart 200, at step 208, after updating the plurality of BER probability records, an estimated BER is identified for the particular network cable based on the estimated BER being associated with a BER probability record, of the plurality of BER probability records, that has a particular probability mass. For example, CAA 152 uses the plurality of probability records maintained for cable 130 to estimate a maximum current BER for the cable and/or a minimum current BER for the cable.

According to an embodiment, CAA 152 estimates the BER for cable 130 in response to receiving an explicit request to estimate a BER for a set of cables including cable 130, or based on a configurable time interval (such as daily) at which CAA 152 automatically estimates a BER for a set of cables including cable 130, etc.

According to an embodiment, CAA 152 bases the estimation of the BER of cable 130 on a confidence metric from a system administrator. For example, CAA 152 receives information that all BER estimations for network 110 should be at a 90% confidence level. Accordingly, CAA 152 identifies a maximum estimated BER and a minimum estimated BER for cable 130 based on the highest hypothetical BER and the lowest hypothetical BER having 1% of the probability mass of the probability distribution for the plurality of maintained probability records maintained for cable 130.

To illustrate in the context of graph 300, CAA 152 determines that 1% of the probability mass from the optimistic end of the plurality of probability records for cable 130 is attributable to the BER hypothesis of $1.6 \times 10^{-12}$. The probability mass of the hypothetical BER is determined by adding all of the probabilities associated with each hypothetical BER between the subject hypothetical BER and the most optimistic hypothesis ($10^{-20}$). Because the probability mass for $1.6 \times 10^{-12}$ is 0.1, CAA 152 determines that, with 90% probability, the BER of cable 130 is worse than $1.6 \times 10^{-12}$. Similarly, CAA 152 determines that, with 90% probability, the BER of cable 130 is better than $0.6 \times 10^{-12}$ based on this hypothetical BER having a probability mass of 0.9 when calculated from the most-optimistic end of the range of BERs.

Using Cable Bit Error Rate Estimates

At step 210, output that specifies the estimated BER for the particular network cable is generated within a memory. For example, CAA 152 generates, within memory of server device 150, output that specifies the estimation that the BER of cable 130 is worse than $1.6 \times 10^{-12}$ and better than $0.6 \times 10^{-12}$. According to an embodiment, the memory of server device 150 into which the output is stored comprises a telemetry store for port 122 and can be inspected, e.g., with telemetry graphing tools.

According to an embodiment, the telemetry-storage systems hold scalar values, and do not hold vectors such as the full probability mass function produced by CAA 152. Hence, in this embodiment for purposes of alerting, a single figure is output from the analysis, namely the BER corresponding to the chosen confidence metric, e.g., the $90^{th}$ percentile of the probability mass function—in other words, a BER value which the analyzer is 90% certain is better than the true BER. In some sense, use of the confidence metric, in conjunction with an alarm threshold described below, corresponds to a customizable false-alarm probability.

According to an embodiment, CAA 152 includes the output in a report of estimated BERs of cables within network 110. According to an embodiment, CAA 152 uses the output to determine whether to raise an alarm for cable 130 based on a configurable alarm threshold. For example, CAA 152 receives information indicating that the alarm threshold for a set of cables that includes cable 130 is at least a minimum of $10^{-11}$, and maintains that information as the alarm threshold BER for cable 130. In response to determining that the output shows an estimation that the BER of cable 130 is 90% likely to be better than $0.6 \times 10^{-12}$, CAA 152 does not raise an alarm.

As a further example, CAA 152 maintains a second plurality of probability records for cable 132. CAA 152 gathers statistics from port 124 and updates the second plurality of hypotheses based on the statistics from port 124 in a manner similar to the probability records for cable 130, as described above.

FIG. 3B depicts a graph 310 of an example probability distribution maintained in the second plurality of probability records for the BER of cable 132, plotted as a probability mass function. Based on the probabilities associated with the updated plurality of probability records for cable 132, CAA 152 determines that, with 90% probability, the BER of cable 130 is worse than $1.6 \times 10^{-9}$, and better than $0.6 \times 10^{-9}$, and stores output to this effect in memory of server device 150.

According to the embodiment in which CAA 152 uses stored outputs that indicate estimations of cable BERs to determine whether to raise an alarm for cable 130, where the configurable alarm threshold BER applicable to cable 132 is at least a minimum of $10^{-11}$, CAA 152 raises an alarm for cable 132 based on the stored output indicating that it is 90% likely that the minimum BER of cable 132 is $0.6 \times 10^{-9}$. Raising the alarm includes one or more of: including an identifier of cable 132 in a report of cables having less-than-acceptable estimated BERs; sending an email identifying cable 132 to one or more email addresses; including an identifier of cable 132 in a log maintained for network 110; producing a report that includes current and/or historical BER estimates for cable 132; etc.

According to an embodiment, CAA 152 uses historical stored outputs indicating estimated cable BERs for a given cable to raise an alarm when the estimated cable BERs for a given cable are deteriorating. For example, CAA 152 maintains an alarm rule that causes CAA 152 to automatically raise an alarm if the BER of a given cable deteriorates by at least an order of magnitude from an average of the BER estimates for the cable generated over the past month (where this standard is an example standard, and any criteria for determining an amount of cable deterioration may be used). Based on the alarm rule, upon storing an output indicating an estimated BER for cable 130, CAA 152 evaluates whether an average value of the historical outputs recorded for cable 130 over the past month indicate a deterioration of the estimated BER of that cable by at least an order of magnitude.

For example, the latest estimated BER for cable 130 is better than $0.6 \times 10^{-12}$. If an average of previous estimated BERs for cable 130 determined over the past month is equal to or better than $0.6 \times 10^{-13}$, CAA 152 automatically raises an alarm for cable 130 using the established alarm rule given that the average estimated BER for the cable over the indicated time period is at least an order of magnitude better than the current estimated BER.

As another example, CAA 152 automatically raises an alarm for cable 130 using the long-term standard deviation of estimated BERs for the cable. To illustrate, CAA 152 raises an alarm for cable 130 when a recent estimated BER for the cable departs from the mean of estimated BERs for the cable recorded over the past month, e.g., by 4× sigma.

Alternative Distribution of Hypothetical Bit Error Rates

According to an embodiment, the hypothetical BERs for cable 130 are distributed over a smaller range, i.e., a range that is more focused at an identified failure BER. For example, a system administrator sets an alarm threshold for cable 130 to $10^{-11}$, as described above. In response to detecting that the alarm threshold for cable 130 is set to $10^{-11}$, CAA 152 automatically sets the range of hypothetical BERs associated with probability records for cable 130 based on the alarm threshold BER, e.g., ranging from $10^{-9}$ to $10^{-13}$. CAA 152 logarithmically distributes a certain number of hypothetical BERs for cable 130, e.g., 100 BER hypotheses, within each decade of the range and generates associated probability records for the hypothetical BERs. By updating and basing estimation of cable BERs on this array of probability records, embodiments generate a more accurate indication of whether the cable BER is better than the indicated alarm threshold BER, though not necessarily a more accurate estimation of the actual BER of the cable.

In some cases, insufficient data for a given cable may cause an alarm to be raised prematurely. For example, a given cable in network 110 has very low utilization, such that, over the course of an hour, the cable carries only $10^6$ bits. During this hour, the cable experiences a single error. Because of the very small amount of information, the cable will appear to have a high BER, which may or may not be an accurate representation of the BER of the cable over a longer period of time. Given the uncertainty of a BER estimated based on so little information, acting on such alarms may cause premature action (such as replacement) for an acceptable cable.

According to an embodiment, CAA 152 implements a condition on raising an alarm that requires a threshold number of bits to be carried by a cable during the period over which the BER estimation is being performed. According to this embodiment, a network administrator controls the amount of information on which BER estimation is based, which allows the administrator to control the potential for false alarms for low-utilization cables.

According to an embodiment, CAA 152 assigns, to the plurality of hypothetical BERs for a given cable, non-uniform priors, which, as a whole, convey information regarding the known properties of the given cable. Assigning non-uniform priors to the hypothetical BERs for a cable allows for more accurate representation of the prior beliefs about the cables. Such additional information provides robustness for the system, especially when there is only a very small amount of data known for a given cable. Specifically, in these cases, the prior probability dominates, allowing for (a) more accurate low-information BER estimates and (b) a broad confidence interval given that there is not enough evidence to reduce the confidence interval.

According to an embodiment, CAA 152 determines the prior probabilities of the hypothetical BERs for cable 130 based on a survey of data coming over the cable over a period of time (e.g., 10 days). Based on the information from the survey, CAA 152 assigns a prior probability to each hypothetical BER for the cable. For example, CAA 152 gathers port data for cable 130 over the survey period and then makes a "prior" BER prediction using the gathered data, i.e., in a similar manner to the BER prediction described above using uniform priors. Because this "prior" BER prediction is based on a much larger amount of information than would be available in a single configurable timeframe (e.g., one hour, used for BER prediction as described in detail above), the "prior" BER prediction is a robust representation of the functioning of cable 130 over that time. Based on this "prior" BER prediction, CAA 152 automatically assigns a relatively higher prior to the hypothetical BER that corresponds to the "prior" BER prediction that was observed during the survey period, and assigns lower (but still non-zero) priors to the other hypothetical BERs, which were not observed during the survey period.

According to another embodiment, CAA 152 determines the non-uniform prior probabilities for the hypothetical BERs for cable 130 based, at least in part, on historic replacement rates for cables in network 110. For example, a historical data store records information indicates that, out of N cables in network 110 and during a certain time interval, X cables were replaced. Thus, CAA 152 estimates a ratio of bad cables to good cables in network 110 to be X:N−X. According to an embodiment, based on this ratio, CAA 152 automatically sets the respective prior probabilities, of hypothetical BERs of cable 130 that are worse than a known threshold of BER acceptability (e.g., the alarm threshold of $10^{-11}$), to be X and the respective prior probabilities of hypothetical BERs better than the threshold of BER acceptability to be N−X, after which CAA 152 normalizes the prior probabilities as described in detail above. Such allocation of prior probabilities assigns higher probabilities According to another embodiment, based on this ratio (e.g., X:N−X), CAA 152 automatically sets the prior probability of each hypothetical BER that is worse than a known threshold of BER acceptability to be the fraction X/[the number of "worse" hypothetical BERs] and the prior probability of hypothetical BERs better than the threshold of BER acceptability to be the fraction (N−X)/[the number of "better" hypothetical BERs], after which CAA 152 normalizes the prior probabilities as described in detail above.

Filtering Errors Detected During Interface Transitions

According to an embodiment, errors that are recorded when interfaces are started or stopped (going "up" and "down" in the usual parlance) are filtered from the data stores on which the estimated BERs are based. Specifically, the errors recorded during such times of transition are not indicative of the general health of the associated cable.

Thus, according to an embodiment, CAA 152 examines the SNMP-derived metric ifOperStatusNumeric, which is an integer with value 1 when an associated interface is up and some larger integer value when the interface is down. All data for a particular one-minute polling interval is ignored (not presented to the analysis) whenever an interface was continually down or made any transition between values in that polling interval. This is determined by comparing the current value of ifOperStatusNumeric with its previous value.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
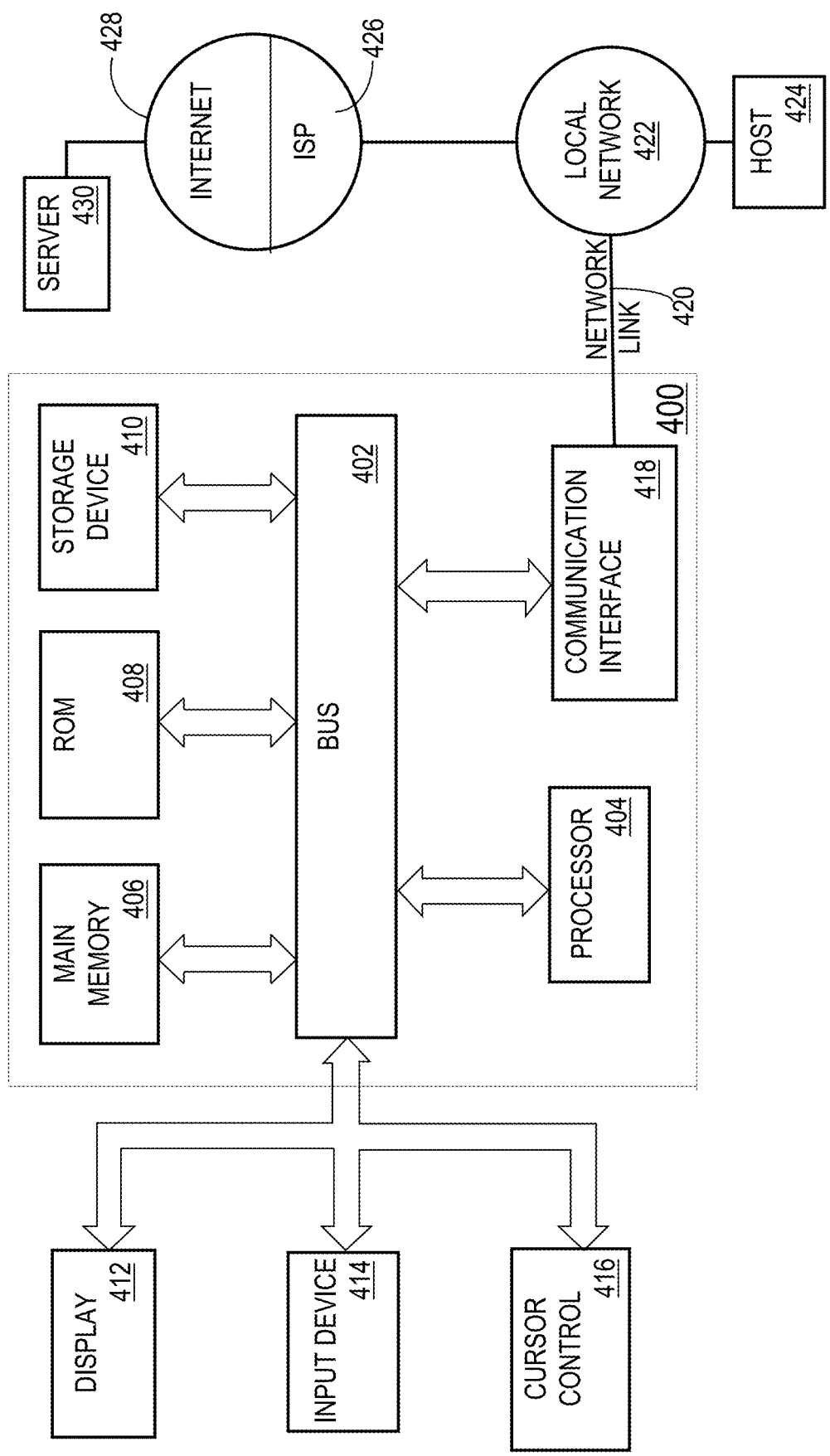
FIG. 4 depicts a computer system that may be used in an embodiment.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
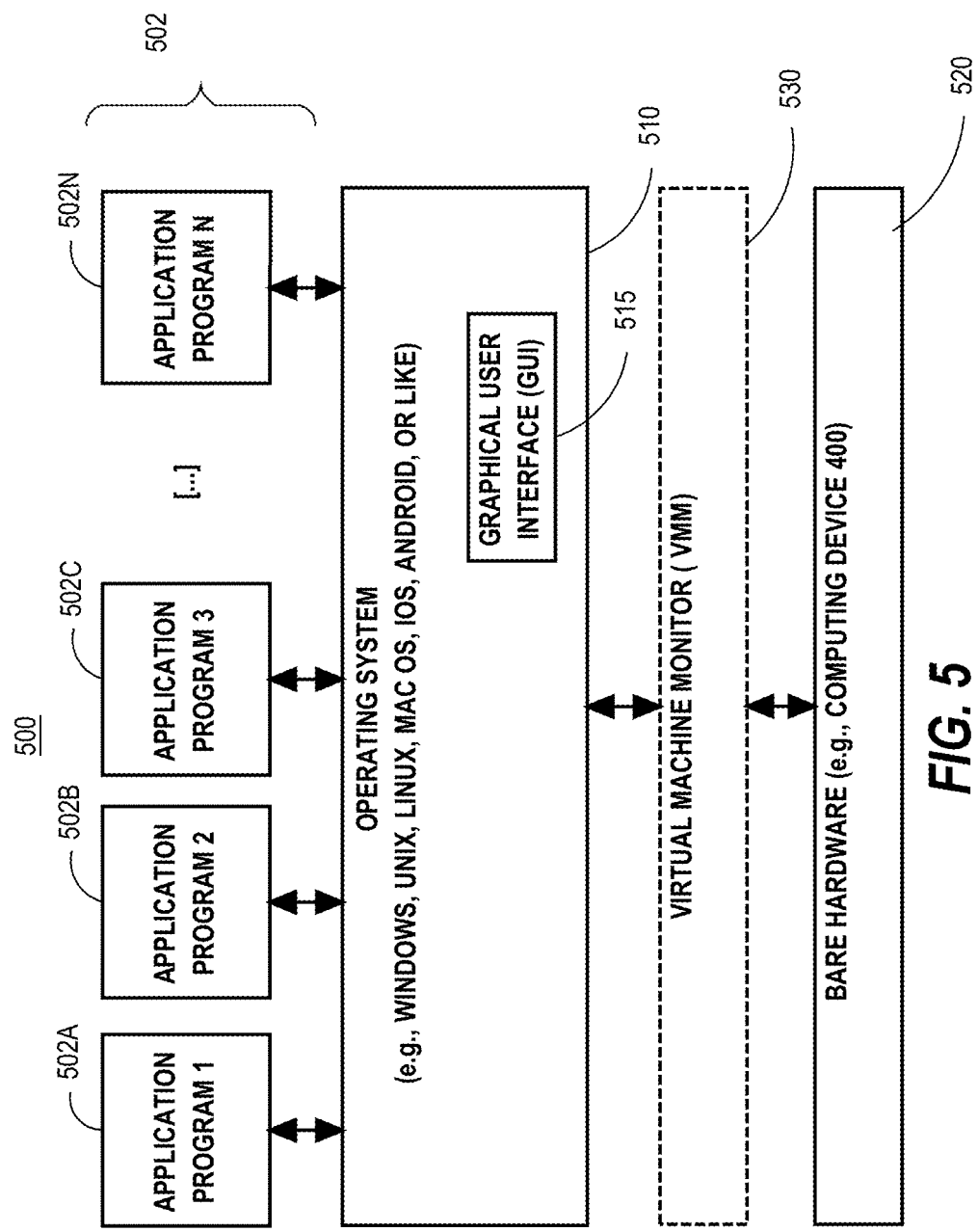
FIG. 5 depicts a software system that may be used in an embodiment.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements.

For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   maintaining a plurality of bit error rate (BER) probability records for a particular network cable attached to a particular switch, in a computer network, at a particular port;
   wherein each BER probability record, of the plurality of BER probability records:
      is associated with a respective hypothetical BER, and indicates a probability that the particular network cable has the hypothetical BER associated with said each BER probability record;
   based, at least in part, on statistics for the particular port, determining a time period-specific number of errors detected in packets that passed through the particular port over a particular period of time;
   updating the plurality of BER probability records by, for each BER probability record of the plurality of BER probability records:
      determining an updated probability of detecting the time period-specific number of errors, for the particular network cable, given the hypothetical BER associated with said each BER probability record, and
      storing, in said each BER probability record, a value that represents the updated probability;
   after updating the plurality of BER probability records, identifying an estimated BER for the particular network cable based on the estimated BER being associated with a BER probability record, of the plurality of BER probability records, that has a particular probability mass; and
   generating, within a memory, output that specifies the estimated BER for the particular network cable;
   wherein the method is performed by one or more computing devices.

2. The method of claim 1 wherein determining an updated probability of detecting the time period-specific number of errors, for the particular network cable, given a particular hypothetical BER associated with a particular BER probability record comprises modeling occurrence of errors using a Poisson distribution.

3. The method of claim 1 wherein:
   the statistics for the particular port comprise one or more sets of statistics; and
   each set of statistics, of the one or more sets of statistics, comprises:
      a poll timestamp,
      a numbers of errors detected in packets seen on the particular port, and
      an average bits per second for the particular port.

4. The method of claim 3 further comprising including, in the statistics for the particular port on which determining the time period-specific number of errors is based, one or more sets of statistics that reflect one or more time periods during which the particular port was continually open.

5. The method of claim 1 further comprising identifying the particular probability mass based on a configurable confidence level value required for the estimated BER for the particular network cable.

6. The method of claim 1, wherein hypothetical BERs associated with the plurality of BER probability records comprise a plurality of hypothetical BERs that are distributed over a range of BERs from $10^{-5}$ to $10^{-20}$.

7. The method of claim 1 wherein:
   the hypothetical BERs associated with the plurality of BER probability records comprise a plurality of hypothetical BERs that are distributed over a particular range of BERs;
   each factor of 10 within the particular range of BERs includes 10 of the plurality of hypothetical BERs logarithmically spaced therein.

8. The method of claim 1 further comprising representing determined probability values in the plurality of BER probability records as logs of the values.

9. The method of claim 1 further comprising, prior to updating the plurality of BER probability records, initializing the plurality of BER probability records to have equal values.

10. The method of claim 1 further comprising:
determining a plurality of non-uniform priors for the plurality of BER probability records based, at least in part, on one or more of:
one or more historical BERs detected for the particular network cable, or
historical cable replacement rates for a plurality of cables in the computer network, wherein the plurality of cables includes the particular network cable; and
prior to updating the plurality of BER probability records, initializing the plurality of BER probability records based on the determined plurality of non-uniform priors.

11. The method of claim 1 further comprising, after updating the plurality of BER probability records:
determining that a particular amount of time has passed since updating the plurality of BER probability records; and
in response to determining that the particular amount of time has passed since updating the plurality of BER probability records:
based, at least in part, on second statistics for the particular port, determining a second time period-specific number of errors detected in packets that passed through the particular port over a second period of time;
wherein the second period of time is at least partially different from the particular period of time; and
updating the plurality of BER probability records by, for each BER probability record of the plurality of BER probability records:
determining a second updated probability of detecting the second time period-specific number of errors, for the particular network cable, given the hypothetical BER associated with said each BER probability record, and
storing, in said each BER probability record, a value that represents the second updated probability of detecting the second time period-specific number of errors.

12. One or more non-transitory computer-readable media storing instructions that, when executed by one or more processors, cause:
maintaining a plurality of bit error rate (BER) probability records for a particular network cable attached to a particular switch, in a computer network, at a particular port;
wherein each BER probability record, of the plurality of BER probability records:
is associated with a respective hypothetical BER, and
indicates a probability that the particular network cable has the hypothetical BER associated with said each BER probability record;
based, at least in part, on statistics for the particular port, determining a time period-specific number of errors detected in packets that passed through the particular port over a particular period of time;
updating the plurality of BER probability records by, for each BER probability record of the plurality of BER probability records:
determining an updated probability of detecting the time period-specific number of errors, for the particular network cable, given the hypothetical BER associated with said each BER probability record, and
storing, in said each BER probability record, a value that represents the updated probability;
after updating the plurality of BER probability records, identifying an estimated BER for the particular network cable based on the estimated BER being associated with a BER probability record, of the plurality of BER probability records, that has a particular probability mass; and
generating, within a memory, output that specifies the estimated BER for the particular network cable.

13. The one or more non-transitory computer-readable media of claim 12 wherein determining an updated probability of detecting the time period-specific number of errors, for the particular network cable, given a particular hypothetical BER associated with a particular BER probability record comprises modeling occurrence of errors using a Poisson distribution.

14. The one or more non-transitory computer-readable media of claim 12 wherein:
the statistics for the particular port comprise one or more sets of statistics; and
each set of statistics, of the one or more sets of statistics, comprises:
a poll timestamp,
a numbers of errors detected in packets seen on the particular port, and
an average bits per second for the particular port.

15. The one or more non-transitory computer-readable media of claim 14 wherein the instructions further comprise instructions that, when executed by one or more processors, cause including, in the statistics for the particular port on which determining the time period-specific number of errors is based, one or more sets of statistics that reflect one or more time periods during which the particular port was continually open.

16. The one or more non-transitory computer-readable media of claim 12 wherein the instructions further comprise instructions that, when executed by one or more processors, cause identifying the particular probability mass based on a configurable confidence level value required for the estimated BER for the particular network cable.

17. The one or more non-transitory computer-readable media of claim 12, wherein hypothetical BERs associated with the plurality of BER probability records comprise a plurality of hypothetical BERs that are distributed over a range of BERs from $10^{-5}$ to $10^{-20}$.

18. The one or more non-transitory computer-readable media of claim 12 wherein:
the hypothetical BERs associated with the plurality of BER probability records comprise a plurality of hypothetical BERs that are distributed over a particular range of BERs; and
each factor of 10 within the particular range of BERs includes 10 of the plurality of hypothetical BERs logarithmically spaced therein.

19. The one or more non-transitory computer-readable media of claim 12 wherein the instructions further comprise instructions that, when executed by one or more processors, cause representing determined probability values in the plurality of BER probability records as logs of the values.

20. The one or more non-transitory computer-readable media of claim 12 wherein the instructions further comprise instructions that, when executed by one or more processors, cause, prior to updating the plurality of BER probability records, initializing the plurality of BER probability records to have equal values.

21. The one or more non-transitory computer-readable media of claim 12, wherein the instructions further comprise instructions that, when executed by one or more processors, cause:
  determining a plurality of non-uniform priors for the plurality of BER probability records based, at least in part, on one or more of:
    one or more historical BERs detected for the particular network cable, or
    historical cable replacement rates for a plurality of cables in the computer network, wherein the plurality of cables includes the particular network cable; and
  prior to updating the plurality of BER probability records, initializing the plurality of BER probability records based on the determined plurality of non-uniform priors.

22. The one or more non-transitory computer-readable media of claim 12 wherein the instructions further comprise instructions that, when executed by one or more processors, cause, after updating the plurality of BER probability records:
  determining that a particular amount of time has passed since updating the plurality of BER probability records; and
  in response to determining that the particular amount of time has passed since updating the plurality of BER probability records:
    based, at least in part, on second statistics for the particular port, determining a second time period-specific number of errors detected in packets that passed through the particular port over a second period of time;
    wherein the second period of time is at least partially different from the particular period of time; and
    updating the plurality of BER probability records by, for each BER probability record of the plurality of BER probability records:
      determining a second updated probability of detecting the second time period-specific number of errors, for the particular network cable, given the hypothetical BER associated with said each BER probability record, and
      storing, in said each BER probability record, a value that represents the second updated probability of detecting the second time period-specific number of errors.

* * * * *